(12) United States Patent
Dath et al.

(10) Patent No.: US 7,265,184 B2
(45) Date of Patent: Sep. 4, 2007

(54) POLYMER HYDROGENATION PROCESS

(75) Inventors: Jean-Pierre Dath, Beloeil (BE); Walter Vermeiren, Seneffe (BE)

(73) Assignee: Total Petrochemicals Research Feluy, Feluy (BE)

( * ) Notice: Subject to any disclaimer, the term of this patent is extended or adjusted under 35 U.S.C. 154(b) by 308 days.

(21) Appl. No.: 10/484,484

(22) PCT Filed: Jul. 16, 2002

(86) PCT No.: PCT/EP02/07948

§ 371 (c)(1),
(2), (4) Date: Sep. 14, 2004

(87) PCT Pub. No.: WO03/008467

PCT Pub. Date: Jan. 30, 2003

(65) Prior Publication Data

US 2005/0222342 A1    Oct. 6, 2005

(30) Foreign Application Priority Data

Jul. 18, 2001 (EP) .................................. 01202731

(51) Int. Cl.
*C08C 19/02*    (2006.01)
(52) U.S. Cl. .............................. 525/331.9; 525/332.9; 525/338; 525/339; 525/342

(58) Field of Classification Search ............. 525/331.9, 525/338, 332.9, 339, 342
See application file for complete search history.

(56) References Cited

U.S. PATENT DOCUMENTS

| 3,729,429 | A | * | 4/1973 | Robson ...................... 502/251 |
| 4,300,003 | A | * | 11/1981 | Mohring et al. ............ 568/863 |
| 4,452,951 | A | | 6/1984 | Kubo et al. |
| 5,155,084 | A | | 10/1992 | Horn et al. |
| 5,243,095 | A | * | 9/1993 | Roberts et al. ............. 568/864 |
| 5,612,422 | A | | 3/1997 | Hucul et al. |
| 5,654,253 | A | | 8/1997 | Hucul et al. |
| 5,700,878 | A | | 12/1997 | Hucul et al. |

OTHER PUBLICATIONS

Hawley's Condensed Chemical Dictionary, 13th edition, John Wiley & Sons, 1997, p. 33.*
Grant & Hackh's Chemical Dictionary, 5th edition, McGraw-Hill, 1987, p. 23.*

* cited by examiner

*Primary Examiner*—Roberto Rabago
(74) *Attorney, Agent, or Firm*—William D. Jackson; Tenley R. Krueger

(57) ABSTRACT

A process for hydrogenating unsaturations in polymers, the process comprising contacting at least one polymer having unsaturations with a catalyst comprising at least one Group Ia, Ib, IIb, VIb, VIIb or VIII metal on a support of an alkaline earth metal silicate having a surface area of at least 30 m2/g at a temperature of from 50 to 250° C. and a pressure of from 5 to 150 bar.

17 Claims, No Drawings

POLYMER HYDROGENATION PROCESS

The present invention relates to a process for hydrogenating unsaturated polymers, in particular a process for the selective hydrogenation of styrene-butadiene-styrene copolymers with high selectivity towards hydrogenation of the ethylenically (olefinic) unsaturated regions with a minimal amount of hydrogenation of aromatic unsaturated regions.

Styrene-butadiene-styrene (SBS) copolymer is produced by means of "living ionic polymerisation" which produces block copolymers consisting of a block of polystyrene, following by a block of polybutadiene and terminated by a further block of polystyrene. In the polybutadiene block, a double bond remains in every butadiene unit. Depending on the insertion mechanism, two geometrical isomers of the butadiene unit can be achieved, namely a 1,4 insertion gives a vinylene bond, which may be cis or trans, while a 1,2 insertion gives a vinyl bond. The remaining double bonds are reactive and limit the stability of the elastomer. To improve this, it is known in the art that the butadiene units of the copolymer can be hydrogenated, giving a block copolymer of polystyrene-poly(ethylene-co-butylene)-polystyrene (SEBS). Homogenous catalysts have been widely used as it has been generally thought in the art that those catalysts can best access the double bonds in the copolymer chains. The most widely accepted catalysts are based on Ziegler-type hydrogenation catalysts, for example nickel salts activated with alkyl-aluminium compounds. A major disadvantage of such catalysts is that they have to be removed from the copolymer due to their possible poisoning and colouration effects.

It has also been known to use heterogeneous catalysts for hydrogenation of SBS.

For example, EP-A-0378104 discloses polymer hydrogenation catalysts for use in hydrogenating ethylenically unsaturated regions with a minimal amount of aromatic unsaturation hydrogenation, for example in SBS copolymers. The catalyst is a heterogeneous catalyst comprising a Group VIII metal and a porous support wherein the porous support is characterised by a pore size distribution such that at least 95% of the pore volume is defined by pores having diameters greater than 45 nm and the ratio of metal surface area to carrier surface area is in the range of from 0.07 to 0.75:1. The catalyst is very active under mild temperature conditions, from room temperature to 140° C. The Group VIII metal may be selected from at least one of palladium, rhodium, ruthenium, cobalt, nickel and platinum on a porous, powdery or granular carrier or support material such as diatomaceous earth, alumina, activated carbon, silica-alumina or silica. The specification emphasises the requirement of exceptionally large pores even with low surface area and pore volume of the support.

WO-A-94/21694 discloses a method for hydrogenation of polyolefin (alkenyl aromatic) polymers or poly(alkenyl aromatic)/polydiene block copolymers that provides hydrogenated polymers with 99.5% or greater saturation and a molecular weight distribution of less than about 3. The method comprises contacting the copolymer with a metal catalyst on a Group I or II metal support. Preferred catalysts are transition metal catalysts with gold, silver, palladium, platinum, rhenium, nickel, rhodium and chromium being especially preferred. The catalyst support is disclosed as being any Group I or II metal salt such as lithium, sodium, potassium, barium, calcium, magnesium or cesium salts, preferably barium or calcium salts, more preferably $BaSO_4$, $CaCO_3$ or $BaCO_3$.

WO-A-96/34896 discloses a process for hydrogenating aromatic polymers in the presence of a silica supported metal hydrogenation catalyst, the silica having a pore size distribution such that at least 98 percent of the pore volume is defined by pores having a diameter greater than 600 angstroms.

U.S. Pat. No. 4,452,951 and its equivalent DE-A-3227650 disclose a process for hydrogenating a conjugated diene polymer in the presence of a hydrogenation catalyst having a porous silica support, the silica having an average pore size diameter of from 80 to 1200 angstroms and a specific surface area of not more than 600 square metres per gram.

U.S. Pat. No. 5,155,084 discloses supported catalysts containing nickel, magnesium oxide and, if desired, further additives, which contain reduced Mg and Ni in a molar ratio of (0.0075 to 0.075):1. The catalysts also have an active nickel metal surface area of 110 to 180 square metres per gram of Ni and a BET total surface area of 160 to 450 square metres per gram. Suitable supports are various water-insoluble materials, including silicates, such as calcium silicates, magnesium silicates and/or aluminium silicates; alumina; silica and/or kieselguhr. The catalysts may be used for the hydrogenation of aliphatic and/or aromatic hydrocarbons.

A number of catalysts for selective hydrogenation of unsaturated hydrocarbons are available commercially. Such catalysts comprise, for example palladium on an alumina support, palladium on an activated carbon support, nickel tungsten on an alumina support and palladium on a barium sulphate support. Such catalysts suffer from the technical disadvantage of a low activity towards ethylenically unsaturated polymers, in other words with a relatively low hydrogenation of the cis and trans ethylenic unsaturations, and of the vinyl unsaturations.

A huge variety of naturally occurring and synthetically produced silicates are known in the art.

U.S. Pat. No. 3,729,429 discloses layered complex metal silicate compositions, especially chrysotiles, and their preparation.

U.S. Pat. No. 3,806,585 discloses the production of a hydrous calcium silicate composed preponderantly of xonotlite in the shape of rod crystals which is described as having outstanding refractory properties, whereby moulded bodies comprised primarily of xonotlite provide strength unattained by other inorganic materials. The specification discloses that hydrous calcium silicate of the xonotlite type has use in construction as a fire proof coating material, as a fire proof moisture retaining material and as a potential filler for plastics and rubber products.

U.S. Pat. No. 3,804,652 discloses a method of producing calcium silicate products, such as drain pipes and insulating material, to form tobermorite having the empirical formula $5CaO.6SiO_2.5H_2O$.

U.S. Pat. No. 3,928,539 discloses a method of producing hydrous calcium silicates such as xonotlite, tobermorite and the like.

U.S. Pat. No. 3,915,725 discloses a process for producing hollow spherical aggregates of xonotlite, which aggregates are employed to form shaped articles.

U.S. Pat. No. 4,298,386 discloses the production of globular secondary particles of the woolastonite group of calcium silicate crystals, including woolastonite and xonotlite.

U.S. Pat. No. 4,689,315 discloses the production of amorphous, approximately spherical silica particles obtained by the acidic hydrolysis of an approximately spherical synthetic calcium silicate. The resultant silica particles, obtained by such acid hydrolysis, are disclosed as being particularly suitable for use as catalyst support. The starting material may comprise spherical synthetic calcium silicates such as xonotlite, tobermorite and/or calcium silicate hydrate, which are then treated with an aqueous acid having a pH of from 0.6 to 3 to produce the resultant silica particles for use as a catalyst support.

U.S. Pat. No. 4,849,195 discloses synthetic substantially spherical crystal aggregates of xonotlite. The aggregates can be mixed with inert particles, for example to produce thermal insulation products. Alternatively, as for U.S. Pat. No. 4,689,315 described above, the aggregates of xonotlite can be used as starting material for acid extraction of calcium atoms in order to obtain silica.

The present invention aims to provide an improved method of selectively hydrogenating unsaturated polymers.

Accordingly, the present invention provides a process for hydrogenating unsaturations in polymers, the process comprising contacting at least one polymer having unsaturations and hydrogen with a catalyst comprising at least one Group Ia, Ib, IIb, VIIb, VIIb or VIII metal on a support of an alkaline earth metal silicate having a surface area of at least 30 m$^2$/g at a temperature of from 50 to 250° C. and a pressure of from 5 to 150 bar.

The present invention is at least partly predicated on the surprising discovery that a basic hydrated crystalline calcium silicate when used as a catalyst support can yield hydrogenation catalysts having high activity and selectivity. This is all the more surprising since xonotlite-type materials have been known for a number of years but to the applicant's knowledge there has been no disclosure or suggestion in the prior art of using xonotlite-type materials as catalysts or catalyst carriers. Rather, as disclosed in for example U.S. Pat. No. 4,689,315 as discussed above, xonotlite has been proposed in the prior art for use as a starting material for the production of silica, where the chemical composition and structure of the xonotlite is destroyed in the preparation of the silica particles by acid hydrolysis.

Preferred embodiments of the present invention will now be described in greater detail by way of example only.

The hydrogenation catalyst of the present invention preferably comprises a supported noble metal catalyst.

The hydrogenation catalyst of the present invention comprises at least one Group Ia, Ib, IIb, VIIb, VIIb or VIII metal, such as Pd, Co, Rh, Ru, Ni, Mo, W, Fe, Cu, Na or K or a combination thereof with palladium being particularly preferred.

The metal or metals may be in the metallic state, in an oxidic state, in a partially reduced oxide state, or in a sulphided or partially sulphided state. Optionally, bi-metallic metals or bi-metallic compounds may be incorporated into the hydrogenation catalyst, such as CoMo, NiW, and NiMo sulphided catalyst for hydro-treatment and, for selective hydrogenation, Cu—Pd, Cu—Ni, Cu—Co, Cu—Pt, Fe—Pd, Co—Pd, Ni—Pd, Pt—Pd, Ag—Pd, Fe—Pt, Ni—Pt, Pt—Sn, Pt—Pb, Pd—Sn, Pd—Pb and Au—Pd.

The preferred catalyst support is a basic alkaline earth metal silicate with a very open and accessible pore structure. A most preferred catalyst support comprises a synthetic crystalline hydrated calcium silicate having a chemical composition of $Ca_6 Si_6 O_{17} (OH)_2$ which corresponds to the known mineral xonotlite (having a molecular formula $6CaO.6SiO_2.H_2O$). The catalyst support preferably has a spherical morphology with a mean diameter of the spherical particles being from 10 to 200 µm. The support has a very open structure comprising an outer shell with a very close-crystal structure surrounding an open inner structure. This may be referred to as an egg shell like structure. The outer shell is formed of interlocked ribbon-shaped crystals yielding regular and homogeneous surface properties. The outer shell is provided with pore openings up to 2000 Angstroms, more preferably from 100 to 1000 Angstroms, in diameter. This provides a good pore structure with high pore volume.

Preferably, the support has a specific surface area well above 10 m$^2$/g, ranging from 30 to 200 m$^2$/g, more preferably from 40 to 90 m$^2$/g.

The support material is preferably pH basic. More preferably, the support material has a minimum basicity corresponding to a pH of greater than 7.5. The pH may be measured when 4 wt % of the support material is immersed in water.

Generally, a synthetic hydrated calcium silicate is synthesised hydrothermally under autogeneous pressure. A particularly preferred synthetic hydrated calcium silicate is available in commerce from the company Promat of Ratingen in Germany under the trade name Promaxon D. This material exhibits some basicity due to the presence of calcium, and in a 4% by weight dispersion in water, the pH reaches a value of around 10. The specific composition of the preferred synthetic hydrated calcium silicate is specified in Table 1.

In order to demonstrate the thermal stability of xonotlite, and therefore the applicability of xonotlite as a carrier for high temperature reactions, commercial xonotlite sold under the trade name Promaxon D was calcined in ambient air at a relative humidity of about 50% at two different temperatures, namely 650° C. and 750° C., each for a period of 24 hours. The initial xonotlite had a crystalline phase $Ca_6Si_6O_{17}(OH)_2$ with a BET surface area of 51 m$^2$/gram and a pore volume (of less than 100 nanometers) of 0.35 ml/gram. After calcination at 650° C., the carrier retained its crystallinity which corresponds to that of xonotlite. Thus after a 24 hour calcination at 650° C., the crystalline phase still comprised xonotlite ($Ca_6Si_6O_{17}(OH)_2$) with a BET surface area of 47.4 m$^2$/gram and a pore volume (less than 100 nanometers) of 0.30 ml/gram. After the calcination at 750° C., the carrier was transformed into wollastonite (having the crystalline phase $CaSiO_3$) by losing one water molecule. This made the carrier less basic. Furthermore, as a result of calcination at 750° C. the carrier lost much of its pore volume, being reduced to 0.09 ml/gram (for pore sizes of less than 100 nanometers) and the BET surface area was correspondingly reduced to 38 m$^2$/gram.

These results show that xonotlite has utility as a basic carrier for high temperature reactions in the range of up to 650° C. In this temperature range the xonotlite retains its basicity, resulting in the carrier being suitable for incorporation in a catalyst for use in high temperature reactions.

The at least one Group Ia, Ib, IIb, VIIb, VIIb or VIII metal is preferably present in an amount of from 0.01 to 10 wt %, more preferably about 0.5 wt %, based on the weight of the supported catalyst.

The catalyst is produced by impregnating the at least one Group Ia, Ib, IIb, VIIb, VIIb or VIII metal on the alkaline earth metal silicate support. Preferably, an incipient wetness impregnation technique is employed where the pores of the support are filled with a volume of solution containing the metal. In this technique, the dried catalyst is impregnated with a solution of a salt of the at least one Group Ia, Ib, IIb, VIIb, VIIb or VIII metal, for example a halide of the metal, in particular the Group VIII metal chloride. The amount of the metal salt is calculated to provide a desired metal content on the support, for example a metal content of from 0.01 to 10 wt % based on the weight of the supported catalyst, most preferably about 0.5 wt % based on the weight of the supported catalyst. The impregnated solid is dried first under vacuum and subsequently at elevated temperature. Finally, the product is calcined, for example at a temperature of about 250° C. for a period of about 3 hours.

Alternatively an excess of solution is used during the impregnation step and the solvent is removed by evaporation. Depending on the properties of the impregnation solution and the carrier the active metal phase can have different locations: (1) the metal or metal compound is concentrated in a thin layer close to the external surface, this may be referred to as an "egg-shell mode", (2) the metal or metal compound is concentrated in a thin layer below the surface, but not penetrating to the centre, this may be referred to as an "egg-white mode", (3) the metal or metal compound is concentrated in a small zone near the centre of the particle carrier, this may be referred to as an "egg-yolk mode", and (4) the metal or metal compound is uniformly distributed throughout the particle carrier. The way that the metal precursor will interact with the carrier depends on the isoelectric point (IEP) which is the pH at which the particle of the carrier in an aqueous solution has no net charge. At pH's above the IEP, cations will be adsorbed, because the surface carries a negative charge; below the IEP, only anions will be adsorbed, because the surface carries a positive charge. During the contact of the impregnating solution and the carrier, ion exchange can also occur. The impregnating solution may be altered by adding complexing agents, which can change the charge of the metal precursor. In another technique, competing ions may be added to improve the spreading of the metal precursor over the carrier.

In alternative embodiments of the catalyst production process, the metal may be deposited on the support by ion exchange or vapour phase deposition.

The feedstocks to be selectively hydrogenated comprise unsaturated copolymers with both ethylenic and aromatic unsaturated regions. The most preferred feedstock comprises an SBS block copolymer, but alternative feedstocks include polyethylene (PE), polypropylene (PP), polybutene (PB), ethylene propylene rubber (EPR), ethylene propylene diene monomer (EPDM), polybutadiene (PB), styrene-butadiene rubbers, polydienes, petroleum resins, synthetic resins, synthetic lubricants like ethylene-propylene co-oligomers and polyalphaolefins.

The catalyst of the present invention is a heterogeneous catalyst which may be used in a batch wise or continuous process. Preferably, the catalyst is used in a fixed bed reactor. A most preferred process employs a continuously operated fixed bed reactor. The unsaturated polymers to be hydrogenated preferably comprise styrene-butadiene-styrene copolymers in solution in a solvent, for example cyclohexane, optionally with a minor amount of tetrahydrofuran (THF), an aromatic such as benzene, toluene or xylene, naphtha, kerosene, and liquefied hydrocarbons, such as $C_3$'s, $C_4$'s etc.

Typically, the SBS copolymer is present in an amount of from 1 to 75% by weight in the solvent, more preferably around 10% by weight.

In the hydrogenation process, the SBS copolymer in solution is contacted batch-wise or continuously passed over the catalyst at elevated temperature and elevated pressure. Typically, the temperature is from 60 to 200° C., more preferably from 100 to 160° C., and most preferably around 120° C. The total pressure is preferably from 5 to 150 bar, more preferably from 20 to 100 bar, most preferably around 60 bar. The hydrogen/aliphatic unsaturation molar ratio is preferably from 2 to 200. The SBS copolymer feed is preferably contacted with the catalyst for a period of from 0.1 to 100 hours, more preferably from 10 to 35 hours in a batchwise hydrogenation. In a continuous hydrogenation the contact time is between 0.1 to 10 litres of solution per litre of catalyst per hour, most preferred about 1 $h^{-1}$.

When hydrogenating unsaturated polymers containing both ethylenically unsaturated regions, for example in the butadiene units of the SBS copolymer, and also aromatic unsaturated regions, for example in the styrene units of the SBS copolymer, the present inventors have found that by using a pH basic catalyst support in conjunction with a catalyst support having large surface area and large pores giving high accessibility and also in combination with low hydrogenation temperature and high hydrogenation pressure, a high selectivity toward hydrogenation of the ethylenically unsaturated regions with a minimal amount of aromatic unsaturation hydrogenation is achieved.

The use of a heterogeneous catalyst in accordance with the invention provides an advantage over homogeneous catalysts that the catalyst can easily be removed from the polymer following the hydrogenation process.

The present invention will now be described with reference to the following non-limiting examples.

The Examples were performed on a laboratory-scale batch-wise bench reactor, where the contact period between the catalyst and the polymer was measured. However, in commercial production it is envisaged that the reaction would be continuous, in which case the polymer feedstock would be fed over the catalyst at an liquid hourly space velocity (LHSV), typically of from 0.1 to 50 $h^{-1}$.

EXAMPLE 1

Catalyst Preparation

A sample of the hydrated crystalline calcium silicate available in commerce under the Trade name Promaxon D was dried at a temperature of 500° C. for a period of 3 hours. The dried support was then impregnated with a solution of palladium chloride ($PdCl_2$) using a wet impregnation technique. In particular, 100 g of dried Promaxon D were progressively contacted with 46.4 g of an aqueous palladium chloride solution, the amount of solution being selected so as to correspond to the estimated absorption capacity of the dried Promaxon D. The amount of the palladium salt was calculated in order to reach a final palladium content in the resultant catalyst of 0.5 wt %. The impregnated solid was dried under vacuum for a period of 6 hours at 25° C. and thereafter dried for a period of 16 hours at a temperature of 110° C. After the drying treatment, the loss on ignition of the resultant catalyst, at a temperature of 500° C. for a period of 1 hour, was around 2.3 wt %. Finally, the catalyst was calcined at a temperature of 250° C. for a period of 3 hours. The powder catalyst was then pelletised. The catalyst was then introduced into a quartz tubular reactor and purged at room temperature (25° C.) under nitrogen. The temperature was then increased up to 100° C. and nitrogen was replaced by hydrogen. The catalyst was then activated under hydrogen at a temperature of 110° C. for a period of 16 hours. The activated catalyst was kept under nitrogen.

EXAMPLE 2

Hydrogenation of SBS Copolymers

An amount of 10 g of the activated catalyst described in Example 1 was transferred under nitrogen into a Parr reactor having a volume of 2 litres with 500 g of an SBS rubber solution in cyclohexane. The SBS is a block copolymer consisting of PS-PB-PS where PS is polystyrene and PB is polybutadiene. The rubber solution had a total SBS content of 16.8 wt %, a Bookfield viscosity at 25° C. of 780 cps, a THF concentration of 60 ppm and no antioxidant. In the SBS copolymer, gel phase chromatography (GPC) yielded a Mp of 76,000 Daltons. The rubber had a total styrene content of 30.9 wt % and the microstructure of the polybutadiene block comprised vinyl bonds 9.6 wt %, trans vinylene bonds 53.7 wt % and cis vinylene bonds 36.7 wt %. The styrene content and the microstructure of the polybutadiene block were determined by infrared analysis done on the dry rubber, after addition of an antioxidant system.

After a leak test with nitrogen, the reactor was then pressurised with hydrogen to an initial pressure of 15 bar. Then the temperature and pressure were progressively increased to a temperature of 170° C. and a hydrogen pressure of 35 bar. The hydrogenation was carried out for a period of 16 hours.

After the hydrogenation process, the SBS solution became cloudy, which was believed to be due to the low vinyl portion of the polybutadiene block. The resultant polyethylene block tended to reticulate. The resultant hydrogenated SBS copolymer was analysed by $^1$H-NMR, with the conversion of the olefinic region being based on the assumption that the styrene content remained constant. The degree of the cis and trans conversion, and of the vinyl conversion, are specified in Table 2.

It may be seen that the catalyst of Example 1 exhibited high conversion levels of the olefinic region which was believed to be due to the accessible active sites in the catalyst support which in turn were believed to be due to the open structure of the catalyst support which was readily accessible by the copolymer molecules and due to the basic nature of the catalyst support.

COMPARATIVE EXAMPLES 1 TO 4

In these Comparative Examples, various hydrogenation catalysts were employed to hydrogenate the same SBS copolymer under substantially the same conditions as for Example 1. The catalysts of Comparative Examples 1 to 4 comprised, respectively, palladium on barium sulphate (available from Janssen Chemicals of Belgium under the reference 19,506,09), nickel tungsten on alumina (available from Procatalyse of France under the reference LD 155), palladium on activated carbon (available from Engelhard of the Netherlands under the reference 3234/B) and palladium on alumina (available from Sud Chimie of Germany under the reference G68C-1). The results are also shown in Table 2. For Comparative Examples 1, 2 and 3, the hydrogenation was performed in two stages at varying temperatures and pressures for different periods of time. For Comparative Example 1, the powder catalyst was pelletised before use, whereas for Comparative Examples 2 to 4 the catalysts were used in the as-received form. The nickel tungsten/alumina catalyst of Comparative Example 2 was additionally sulphurised with dimethyl disulphide (DMDS) in naphtha. In Comparative Example 1 the conversion of the ethylenically unsaturated regions was determined by infra-red analysis rather than $^1$H-NMR.

It may be seen from a comparison of the conversion levels of Comparative Examples 1 to 4 and Example 1 that the conversion levels of the ethylenically unsaturated regions is higher for Example 1 than for Comparative Examples 1 to 4. The nickel tungsten/alumina and palladium/activated carbon catalysts of Comparative Examples 2 and 3 exhibited the lowest hydrogenation activity.

EXAMPLE 3

In this Example, the catalyst produced in accordance with Example 1 was employed to hydrogenate a SBS feedstock which had been produced without any antioxidant and had been stored under nitrogen. The rubber contained a greater proportion of vinyl bonds than the rubber of Example 2 which, after hydrogenation, resulted in a polyethylene-co-butylene polymer which does not reticulate.

The feedstock had a THF concentration of 5000 ppm in solution cyclohexane. The styrene content was 32% by weight and the vinyl/polybutadiene sequence was 33.8% by weight, both determined in infra-red spectroscopy. The value of Mp of the final SBS as determined by gel phase chromatography was 77,700 Daltons. Following evaporation of the solvent by an infra-red lamp, it was determined by that the solids content in the cyclohexane was 12.4 wt %. The living polymer had been produced using an organolithium initiator, using propylene oxide as the terminator. NMR analysis on the solid yielded a styrene content of 32.2 wt %, a combined cis vinylene and trans vinylene content of 43.8 wt % and a vinyl content of 24.0 wt %.

The SBS copolymer was subjected to hydrogenation using substantially the same technique as employed in Example 2 and the results are shown in Table 3.

It may be seen that for a hydrogenation temperature of 120° C. and a total pressure of 60 bar, a high conversion rate of the ethylenically unsaturated region was achieved with a minimal amount of aromatic unsaturation hydrogenation. At least 98% of the vinyl groups are hydrogenated to achieve the desired degree of hydrogenation.

At a hydrogenation temperature of 170° C. and a pressure of 35 bar, the vinyl bond hydrogenation was found to be accompanied by the hydrogenation of a significant amount of the aromatic ring. When the feedstock was diluted with further cyclohexane in the ratio 1:1, complete removal of the vinyl bond was achieved in a shorter time period, but the hydrogenation also becomes more aselective since more aromatic rings were converted for the same degree of vinyl hydrogenation.

For a pressure of 35 bar, the hydrogenation was performed at temperatures of 150, 160 and 170 and 180° C. The results are also shown in Table 4. By increasing the temperature, the conversion rate was increased but the vinyl hydrogenation tended to become less selective.

When the reactor pressure was increased to a value of 60 bar, it was again found that increasing the temperature increases the conversion rate, but decreases the selectivity of the vinyl hydrogenation. At the pressure of 60 bar, it was found that complete vinyl hydrogenation can be achieved without significantly affecting the aromatic ring. This result suggested that a rather high pressure is required to convert the vinyl bond to a high extent without hydrogenation of the aromatic nuclei. When working at lower pressure, it is required to increase the reactor temperature to reach an acceptable conversion rate but by increasing the temperature, the vinyl hydrogenation becomes aselective. Without being bound by theory, it is believed that this is due to a higher activation energy being required to hydrogenate the aromatic rings, so that at a higher reaction temperature the relative reaction rate ($r_{olefins}/r_{aromatics}$) decreases leading to a lower selectivity for olefin hydrogenation. Thus at 120° C. and a pressure of 60 bar, the cis and trans double bonds are also completely hydrogenated without any loss of unsaturation in the aromatic rings. The conversion of the cis and trans double bonds is however slower than that of the vinyl groups.

The determination of the conversion of the styrene, cis and trans vinylene and vinyl groups was determined by $^1$H/NMR analysis using hexamethyl disiloxane (Me$_3$Si—O—SiMe$_3$) as a standard.

TABLE 1

| Composition | |
|---|---|
| SiO$_2$ | 49.0 wt % |
| CaO | 42.9 wt % |
| Al$_2$O$_3$ | 0.2 wt % |
| MgO | 0.3 wt % |
| Fe$_2$O$_3$ | 1.1 wt % |
| Na$_2$O | 0.2 wt % |
| K$_2$O | 0.2 wt % |
| Loss on Ignition | 6.1 wt % |
| Specific area (BET) | 50 m$^2$/g |
| Bulk Density | 90 g/l |
| Average particle size | 45 μm |

TABLE 2

|  | Comparative Example 1 | Comparative Example 2 | Comparative Example 3 | Comparative Example 4 | Example 2 |
|---|---|---|---|---|---|
| Catalyst | Pd/BaSO$_4$ | NiW/Al$_2$O$_3$ | Pd/C | Pd/Al$_2$O$_3$ | Pd/Promaxon D |
| Catalyst weight/gr | 7.5 | 10 | 10 | 10 | 10 |
| SBS weight/gr | 533 | 473 | 518 | 573 | 512 |
| Conditions |  |  |  |  |  |
| start T/° C. | 30 | 22 | 26 | 24 | 25 |
| H2 pressure/bar | 30 | 30 | 30 | 30 | 15 |
| 1st T/° C. | 150 | 150 | 150 | 170 | 170 |
| H2 pressure/bar | 30 | 30 | 30 | 35 | 35 |
| time/h | 0.5 | 3 | 2 | 30 | 16 |
| 2nd T/° C. | 150 | 170 | 170 | — | — |
| H2 pressure/bar | 35 | 30 | 35 | — | — |
| time/h | 6 | 18 | 20 | — | — |
| Conversion % |  |  |  |  |  |
| Cis & Trans | — | 8.8 | 41 | 81.7 | 92.4 |
| Vinyl | — | 55.3 | 84.4 | 89.9 | 100 |
| Cis & Trans & Vinyl | 20 | 16.6 | 48.3 | 83.1 | 92.4 |

TABLE 3

| T (° C.) | t (h) | p total (bar) | dilution | % conv ST | % conv C + T | % conv Vin |
|---|---|---|---|---|---|---|
| 170 | 1 | 35 | none | 0 | 27 | 53 |
| 170 | 5 | 35 | none | 8 | 56 | 88 |
| 170 | 21 | 35 | none | 53 | 88 | 100 |
| 170 | 1 | 35 | 1:1cyC6 | 49 | 73 | 85 |
| 170 | 5 | 35 | 1:1CyC6 | 64 | 92 | 99 |
| 170 | 10 | 35 | 1:1CyC6 | 72 | 95 | 100 |
| 170 | 21 | 35 | 1:1CyC6 | 97 | 100 | 100 |
| 150 | 1 | 35 | none | 0 | 9 | 2 |
| 150 | 5 | 35 | none | 0 | 15 | 20 |
| 150 | 10 | 35 | none | 1 | 35 | 50 |
| 150 | 21 | 35 | none | 1 | 53 | 78 |
| 160 | 1 | 35 | none | 0 | 35 | 70 |
| 160 | 5 | 35 | none | 0 | 53 | 88 |
| 160 | 10 | 35 | none | 23 | 73 | 98 |
| 160 | 21 | 35 | none | 67 | 90 | 100 |
| 180 | 1 | 35 | none | 15 | 48 | 79 |
| 180 | 5 | 35 | none | 55 | 81 | 96 |
| 180 | 21 | 35 | none | 79 | 100 | 100 |
| 120 | 1 | 60 | none | 0 | 1 | 11 |
| 120 | 5 | 60 | none | 3 | 29 | 67 |
| 120 | 10 | 60 | none | 0 | 40 | 90 |
| 120 | 21 | 60 | none | 0 | 69 | 100 |
| 120 | 29 | 60 | none | 0 | 80 | 100 |
| 120 | 34 | 60 | none | 0 | 87 | 100 |
| 120 | 48 | 60 | none | 3 | 92 | 100 |
| 150 | 1 | 60 | none | 11 | 62 | 93 |
| 150 | 5 | 60 | none | 20 | 73 | 98 |
| 150 | 10 | 60 | none | 28 | 81 | 99 |
| 150 | 21 | 60 | none | 76 | 95 | 100 |
| 190 | 5 | 60 | none | 74 | 91 | 100 |
| 190 | 10 | 60 | none | 97 | 100 | 100 |
| 190 | 21 | 60 | none | 100 | 100 | 100 |

The invention claimed is:

1. A process for hydrogenating unsaturations in polymers, the process comprising contacting at least one polymer having unsaturations and hydrogen with a supported catalyst at a temperature of from 5 to 250° C. and a pressure of from 5 to 150 bars, said catalyst comprising at least one Group Ia, Ib, IIb, VIb, VIIb or VIII metal on a support comprising crystalline calcium silicate having a surface area of at least 30 m$^2$/g.

2. A process according to claim 1 wherein said support has a surface area within the range of 30 to 200 m$^2$/g.

3. A process according to claim 1 wherein said support has a surface area within the range of 40 to 90 m$^2$/g.

4. A process according to claim 1 wherein the calcium silicate has the chemical composition Ca$_6$Si$_6$O$_{17}$(OH)$_2$.

5. A process according to claim 1 wherein the support is in the form of substantially spherical particles having a mean diameter of from 10 to 200 microns and comprising pores in the particles having a diameter of from 100 to 2000 Angstroms.

6. A process according to claim 1 wherein the support has a basicity corresponding to a pH of greater than 7.5 when the support is immersed in water at a concentration of 4 wt. %.

7. A process according to claim 1 wherein said catalyst comprises palladium impregnated onto the support in an amount of from 0.01 to 10 wt. % based on the weight of the supported catalyst.

8. A process according to claim 1 wherein said catalyst is contacted at a temperature within the range of 100 to 160° C. and a pressure within the range of 20 to 100 bars.

9. A process according to claim 1 wherein said at least one polymer is dissolved in a solvent to provide a feedstock having a solids content of from 1 to 75 wt. %.

10. A process according to claim 1 wherein said at least one polymer has ethylenically unsaturated regions and aromatically unsaturated regions and the ethylenically unsaturated regions are selectively hydrogenated.

11. A process according to claim 1 wherein said at least one polymer comprises a styrene-butadiene-styrene copolymer.

12. A process for selectively hydrogenating at least one unsaturated polymer having ethylenically unsaturated regions and aromatically unsaturated regions comprising contacting said at least one polymer with hydrogen in the presence of a supported catalyst comprising at least one Group Ia, Ib, IIb, VIb, VIIb or VIII metal on a crystalline calcium silicate support having a surface area of at least 30 $m^2/g$, the support being in the form of substantially spherical particles and comprising pores in the particles having a diameter of from 100 to 2000 Angstroms.

13. A process according to claim 12 wherein said pores have a diameter within the range of 100 to 1000 Angstroms.

14. A process according to claim 12, wherein the calcium silicate has the chemical composition $Ca_6Si_6O_{17}(OH)_2$.

15. A process according to claim 12 wherein said at least one polymer comprises a styrene-butadiene-styrene block copolymer.

16. A process according to claim 15 wherein said styrene-butadiene-styrene block copolymer is passed over the catalyst at a temperature within the range of 60-200° C. and a pressure within the range of 5-150 bars.

17. The process according to claim 16 wherein said temperature is within the range of 100-160° C. and said pressure is within the range of 20-100 bars.

* * * * *